United States Patent
Gervautz et al.

(10) Patent No.: US 12,412,300 B2
(45) Date of Patent: Sep. 9, 2025

(54) MACHINE VISION DETERMINATION OF LOCATION BASED ON RECOGNIZED SURFACE FEATURES AND USE THEREOF TO SUPPORT AUGMENTED REALITY

(71) Applicant: PTC Inc., Boston, MA (US)

(72) Inventors: Michael Gervautz, Pressbaum (AT); Zsolt Szalavari, Vienna (AT); Emilio Maggio, Vienna (AT); Alessandro Boccalatte, Vienna (AT); Michal Havlena, Vienna (AT); Jiri Hörner, Vienna (AT)

( * ) Notice: Subject to any disclaimer, the term of this patent is extended or adjusted under 35 U.S.C. 154(b) by 321 days.

(21) Appl. No.: 17/948,158

(22) Filed: Sep. 19, 2022

(65) Prior Publication Data

US 2023/0020667 A1 Jan. 19, 2023

Related U.S. Application Data

(63) Continuation of application No. PCT/US2021/022856, filed on Mar. 17, 2021.
(Continued)

(51) Int. Cl.
*G06T 7/73* (2017.01)
*G06T 17/20* (2006.01)
(Continued)

(52) U.S. Cl.
CPC .............. *G06T 7/73* (2017.01); *G06T 17/20* (2013.01); *G06T 19/003* (2013.01);
(Continued)

(58) Field of Classification Search
CPC ......... G06T 7/73; G06T 17/20; G06T 19/003; G06T 19/006; G06T 19/20;
(Continued)

(56) References Cited

U.S. PATENT DOCUMENTS

2015/0161476 A1* 6/2015 Kurz ................... G06T 7/74
382/190
2018/0139431 A1* 5/2018 Simek .................. H04N 13/271
(Continued)

FOREIGN PATENT DOCUMENTS

WO 2018222756 A1 12/2018

OTHER PUBLICATIONS

"Matterport AR Tech Demo | Interactive Augmented Reality", Web page printout from URL: https://vimeo.com/252569817, Jan. 1, 2019, 2 pages.
(Continued)

*Primary Examiner* — Stephen P Coleman
(74) *Attorney, Agent, or Firm* — Outside General Counsel, LLP; Alexander Franco

(57) ABSTRACT

A system and method can support image based determination of mobile device location through recognition of surface features for a previously scanned physical environment. The system and method can also support authoring and positioning of augmented reality features in an authoring interface using the same images and positions of surface features that are to be used for subsequent mobile device localization. As a result, mobile devices leveraging those same images and positions of surface features for localization will be more likely to obtain a localization that is consistent with the positioning displayed in the authoring interface. Augmented reality features authored using the same scan of the environment can be reliably displayed to an end user of an augmented reality application in a position consistent with their authoring in a common coordinate system, even though the authoring may have been performed remotely, away from the actual situs of the physical environment.

17 Claims, 2 Drawing Sheets

Related U.S. Application Data

(60) Provisional application No. 62/990,705, filed on Mar. 17, 2020.

(51) Int. Cl.
| | |
|---|---|
| *G06T 19/00* | (2011.01) |
| *G06T 19/20* | (2011.01) |
| *G06V 10/25* | (2022.01) |
| *G06V 10/44* | (2022.01) |
| *G06V 10/74* | (2022.01) |

(52) U.S. Cl.
CPC ............ *G06T 19/006* (2013.01); *G06T 19/20* (2013.01); *G06V 10/25* (2022.01); *G06V 10/44* (2022.01); *G06V 10/761* (2022.01); *G06T 2207/10028* (2013.01); *G06V 2201/07* (2022.01)

(58) Field of Classification Search
CPC . G06T 2207/10028; G06T 2207/10024; G06T 2207/30204; G06T 7/521; G06T 7/579; G06T 7/74; G06T 2207/30244; G06V 10/25; G06V 10/44; G06V 10/761; G06V 2201/07; G01S 5/16
USPC ........................................................ 382/103
See application file for complete search history.

(56) References Cited

U.S. PATENT DOCUMENTS

| | | | |
|---|---|---|---|
| 2019/0147619 A1* | 5/2019 | Goldman | ................ G06T 17/05 382/154 |
| 2019/0156577 A1 | 5/2019 | Barros et al. | |
| 2019/0370544 A1* | 12/2019 | Wright, Jr. | ................ G06T 7/20 |

OTHER PUBLICATIONS

"NavVis now uses SLAM to automatically remove moving objects from point clouds", Transcript of video located at URL: https://www.youtube.com/watch?v=ljKSuVao4OE, Feb. 13, 2019, 2 pages.

"WGAN-TV Live from Inman Connect—Matterport CEO Bill Brown and GeoCV Co-Founder Anton Yakubenko, PhD", Printout of web page at URL: https://vimeo.com/252343762?embedded=true&source=vimeo_logo&owner-46849574, Jan. 1, 2018, 4 pages.

Chokkattu, "How to navigate with the AR mode in Google Maps to find your way", Web page printout of URL: https://www.digitaltrends.com/mobile/how-to-use-ar-mode-google-maps/, Aug. 8, 2019, 11 pages.

Dymczyk, et al., "Will it last? Learning Stable Features for Long-Term Visual Localization", 3D Vision (3DV), 2016 4th International Conference onAt: Stanford University, California, USA, Oct. 1, 2016, 12 pages.

European Patent Office, "International Search Report and Written Opinion", International Application No. PCT/US2021/022856, 11 Pages.

Kavafian, "Google Maps will use your camera to determine your location more accurately", Web page printout of URL: https://www.androidpolice.com/2019/02/12/google-maps-will-use-your-camera-to-determine-your-location-more-accurately/, Feb. 12, 2019, 14 pages.

Klinger, et al., "Street View Motion-from-Structure-from-Motion", 2013 IEEE International Conference on Computer Vision, Dec. 1, 2013, pp. 953-960.

Makarov, "How Augmented Reality Navigation Systems Work", Web page printout from URL: https://mobidev.biz/blog/augmentedreality-indoor-navigation-app-developement-arkit, Jun. 14, 2021, 13 pages.

Smigrod, "Chokkattu", Web page printout of URL: https://www.wegetaroundnetwork.com/topic/6194/matterport-pre-announces-ar-meets-mattertags/, Jan. 1, 2018, 12 pages.

* cited by examiner

MACHINE VISION DETERMINATION OF LOCATION BASED ON RECOGNIZED SURFACE FEATURES AND USE THEREOF TO SUPPORT AUGMENTED REALITY

RELATED APPLICATIONS

The subject matter of this application is related to Patent Cooperation Treaty Application PCT/US2021/022856, filed on Mar. 17, 2021 and U.S. Provisional Application No. 62/990,705, filed on Mar. 17, 2020, all of which applications are hereby incorporated by reference.

BACKGROUND OF THE INVENTION

Many techniques are available for computationally determining a 3-D physical or geographic location and/or a 6-D pose of a device, but such techniques have limitations, particularly in indoor physical environments such as within buildings.

The Global Positioning System (GPS) and the Global Navigation Satellite System (GLONASS) use satellites to send highly time-accurate synchronized signals to a receiver, which processes the signals with triangulation calculations to determine geolocation. These technologies are, of course, incorporated into most current mobile phones. While the precision of these systems is adequate for providing driving or walking directions outdoors, they may fail, such as when the satellite signals are blocked by structure. In addition, due to signal reflections and multiple signal paths, the satellite signals generally do not provide an accurate location when indoors even if the signals are received. Further, even if accurate, the level of accuracy, which may be at best a few meters, is insufficient for many indoor use purposes.

Signals from multiple WiFi routers or Bluetooth beacons with known positions in an environment can be processed based on signal timing and/or strength with triangulation calculations to determine location. This technique can be made more precise than GPS, but it requires specific instrumentation of the environment with WiFi routers or Bluetooth beacons and an initial calibration.

Feeds from indoor surveillance cameras can be analyzed with computer vision techniques to determine locations of objects within the cameras' fields of view, assuming the object and/or device can be uniquely visually identified. This technique, however, requires installation and constant monitoring of the cameras, as well as communication between the monitoring system and the device to be located.

In order to determine pose, in addition to location, a compass, an inertial measurement unit, and/or a gyroscope can be used to determine orientation in conjunction with the above-described location techniques, but they may not provide sufficient accuracy for many purposes.

Fiducial markers can be placed at various specifically recorded locations in an environment to provide a framework for determining location. A camera device, such as a smart phone, tablet, or head-mounted device, can use computer vision to recognize known markers and access their recorded locations to determine the relative position and orientation of the device using triangulation calculations. The placement and recording of locations of the markers, however, requires overhead effort, and the markers may be unsightly and/or undesirable in certain environments.

Techniques are also available for scanning physical environments and processing the scanned data to create 3-dimensional colored and/or textured data representations of those environments. These representations can be used for virtually and visually navigating and identifying locations within the environments though a 2-D computer display or thorough a virtual reality device. By way of example, devices and/or services for scanning and processing scan data for physical environments are available from: Matterport, Inc. of Sunnyvale, California; NavVis GmbH of Munich, Germany; Leica Geosystems AG; and FARO Technologies, Inc. of Lake Mary, Florida.

The Matterport Pro2 Camera, for example, is a high resolution digital photographic camera that performs 3D scanning of photographed spaces where each captured pixel is associated with a depth of the surface the pixel represents from the camera. The camera can be mounted on a tripod and is configured to rotate about a vertical axis to take panoramic 3D digital photographs. Matterport provides tablet and mobile phone applications for controlling the Pro2 camera so as to photograph and scan an environment using multiple panoramas captured from different locations. Matterport's application software uses simultaneous localization and mapping techniques to guide a user where to place the camera for additional panoramas in order to fully capture a desired space. Simultaneous localization and mapping techniques are also used to determine the location from each panorama is captured by the camera relative to other panoramas captured during a scanning session. Matterport also provides services, primarily targeted at the real estate sale and rental market, for processing and hosting data captured by the Pro2 camera so as to deliver 2-dimensional and/or virtual reality experiences to end users that enable the end users to virtually navigate through the captured spaces based on the processed data.

The Matterport service processes the data captured from multiple scans of the Pro2 camera to create both a colorized point cloud representation and a 3-dimensional textured polygon mesh representation of a captured space, such as the interior of an apartment home. The colorized point cloud is a 3-dimensional set of colored points representing the surfaces of the space as measured by the depth sensing capability of the Pro2 camera. The textured polygon mesh, is a set of interconnected textured and/or colored polygons, which can be created from the point cloud and/or the captured images using known techniques. The colorized point cloud and/or the textured polygon mesh can then be presented to an end user in what is referred to as a "dollhouse view". The dollhouse view makes the space, such as the apartment home, appear to the user as an orientable and navigable model of the space in a user interface, such as a computer or virtual reality display. As the user zooms in on the dollhouse view to view portions of the apartment home up close, the user can be virtually jumped to a location from which an actual panorama image was taken by the Pro2 camera. Now, actual images captured by the Pro2 replace the textured polygon mesh representation in the user interface to provide clearer detail of actual digital photographs. The user can zoom and pan within a panorama image as well as navigate between different panoramas by selecting points within the image proximate where other panoramas were taken. The user can also zoom back out to the textured polygon mesh dollhouse view. While viewing a virtual space, users can also select points in an image between which the service will calculate and display corresponding measurements from the physical captured space, based on the 3D scan data. Therefore, users can take measurements of lengths and distances in apartment home remotely through a virtual interface after the scan of the space is performed.

Matterport® makes certain captured and processed data from photographed, scanned locations available in what it calls a Matterpak™ Bundle. The Matterpak Bundle includes, for example: a colorized point cloud, a 3D mesh file including necessary texture map images files needed to render the 3D mesh, as well as the captured panorama images and pixel depth and/or location information. The Matterpak™ Bundle provides the ability to determine physical locations corresponding to pixels or groups of pixels in images captured by the Pro2 camera.

SUMMARY OF THE INVENTION

A system and method can support image based localization (determination of location) of devices through recognition of surface features for a previously scanned physical environment. The system and method can also support authoring and positioning of augmented reality features in an authoring interface using the same images and positions of surface features that are to be used for subsequent mobile device localization. As a result, mobile devices leveraging those same images and positions of surface features for localization will be more likely to obtain a localization that is consistent with the positioning displayed in the authoring interface. Augmented reality features authored using the same scan of the environment can be reliably displayed to an end user of an augmented reality application in a position consistent with their authoring in a common coordinate system, even though the authoring may have been performed remotely, away from the actual situs of the physical environment. Any arbitrary coordinate system for localization in the physical environment can be used, such as one centered on a first of multiple panoramic scans, and an absolute or geographical location is not needed to implement augmented reality.

The method can include the processing of captured image data to support localization of end user camera devices within a captured physical environment. The method can also include the use of the processed data by end an end user camera device to perform the localization. The method can also include the use by an authoring user of an authoring interface to author augmented reality features in a captured physical environment. The method can also include the display of authored augmented reality features to an end user based on the localization of the end user device in the environment. The method, which can be performed by one or more computer systems, where each computer system has at least one processor and a memory, will be described in additional detail in accordance with various embodiments in the following paragraphs of this summary.

A server computer can access image data including one or more digital images that have been captured of a physical environment by a scanning camera device. The image data can further include positional data for the one or more digital images. The server computer can process the image data to algorithmically identify a plurality of individual surface features represented in the one or more digital images. The server computer can, for each of the plurality of individual surface features: create a feature descriptor based on the surface feature as represented in one of the one or more digital images, and determine, based on the positional data, and associate with the surface feature, a 3-dimensional location of the surface feature in the physical environment. The server and/or an end user camera device can organize the features, based on the feature descriptors, in a feature search structure. The server and/or an end user camera device can, subsequent to the organizing, access an image of a portion of the physical environment captured by the end user camera device that is not the scanning camera device.

The server and/or an end user camera device can, process the image to algorithmically identify at least four image features represented in the captured image. The server and/or an end user camera device can, for each feature of the at least four image features: identify a 2-dimensional location of the image feature within the captured image, create a feature descriptor based on the image feature as represented in the captured image, search within the feature search structure to identify a corresponding surface feature matching the feature descriptor of the image feature, and access the 3-dimensional location of the corresponding surface feature. The server and/or an end user camera device can, determine a 3-dimensional location or a 6-dimensional pose of the end user camera device based on: the 3-dimensional locations of the corresponding surface features matching the at least four image features, and the 2-dimensional locations of the image features within the captured image.

An authoring computer can display to an authoring user an authoring interface through which the authoring user can navigate within a visual rendering, based on the image data, of the physical environment. The authoring computer can, in response to input from the authoring user with respect to the visual rendering of the physical environment, determine based on the positional data, a 3-dimensional location or a 6-dimensional pose within the physical environment selected by the authoring user. The authoring computer can, in response to input from the authoring user, associate an augmented reality feature with the 3-dimensional location or the 6-dimensional pose selected by the authoring user. The authoring computer can, display the augmented reality feature to the authoring user in the authoring interface in accordance with the 3-dimensional location or the 6-dimensional pose selected by the authoring user. The end user camera device can, in real-time and in response to an end user capturing the image from the physical environment using the end user camera device: determine, based on the 6-dimensional pose of the end user camera device, that the captured image contains the 3-dimensional location or the 6-dimensional pose selected by the authoring user and display the augmented reality feature to the end user in a location or pose corresponding to the 3-dimensional location or the 6-dimensional pose selected by the authoring user based on the 6-dimensional pose of the end user camera device.

The method can be performed wherein the augmented reality feature is displayed to the end user superimposed over a display of the captured image on a display screen of the end user camera device in an augmented reality application.

The method can be performed wherein the end user camera device is a mixed reality device, and wherein the augmented reality feature is displayed to the end user superimposed over and in alignment with the end user's direct sight view of the physical environment by the end user camera device.

The method can be performed wherein the image data further comprises a colorized point cloud or a textured polygon mesh created based on the one or more digital images and the positional data, and wherein the visual rendering is further based on the colorized point cloud or the textured polygon mesh.

The method can be performed wherein the positional data comprises, for each of the one or more digital images: a 6-dimensional pose of the scanning camera device, and depths or 3-dimensional locations of pixels.

The method can be performed wherein the one or more digital images comprise one or more pairs of partially overlapping images with each digital image being captured from one of a plurality of locations within the physical environment, and wherein for each of the one or more digital images, the 6-dimensional pose of the scanning camera device is computed based on image analysis of one or more of the pairs of partially overlapping images.

The method can be performed wherein the scanning camera device comprises a depth camera configured to measure and record distances of physical surfaces from the depth camera for pixels representing the physical surfaces in the one or more digital images.

The method can be performed wherein the image data comprises one or more point clouds defining 3-dimensional locations of physical surfaces represented by pixels of the one or more digital images.

The method can be performed wherein the scanning camera device is a 3D scanner configured to generate and register one or more point clouds in alignment with the one or more digital images.

The method can be performed wherein the one or more digital images comprise panorama images.

In addition, the server computer can process the image data to identify areas of the one or more digital images representing moveable objects; and exclude the identified areas from consideration when "processing the image data to algorithmically identify a plurality of individual surface features represented in the one or more digital images".

The method can be performed wherein the "areas of the one or more digital images representing moveable objects" are identified using a trained machine classifier.

The method can be performed wherein the plurality of individual surface features are algorithmically identified with a bias in favor of even spacing between nearest individual surface features.

The method can be performed wherein the plurality of individual surface features are algorithmically identified with a bias against uneven gaps between nearest individual surface features.

The method can be performed wherein the feature search structure is a tree-based search structure indexed based on the feature descriptors.

The method can be performed wherein the 3-dimensional location or the 6-dimensional pose of the end user camera device is determined in a relative coordinate frame, wherein the 3-dimensional location or the 6-dimensional pose selected by the authoring user is specified in the relative coordinate frame, and wherein the relative coordinate frame is not itself specifically located relative to an absolute coordinate frame.

The method can be performed wherein the absolute coordinate frame comprises geolocation.

The method can be performed wherein the "areas of the one or more digital images representing moveable objects" are identified based on the one or more digital images.

The method can be performed wherein the "areas of the one or more digital images representing moveable objects" are identified further based on the positional data.

The method can be performed wherein the "areas of the one or more digital images representing moveable objects" are identified further based on a point cloud representation of the physical environment.

The method can be performed wherein the "areas of the one or more digital images representing moveable objects" are identified further based on polygon mesh representation of the physical environment.

The method can be performed wherein the "areas of the one or more digital images representing moveable objects" are identified by at least determining that a volume of space within the physical environment contains a moveable object and mapping the volume of space to one or more of the moveable images.

The method can be performed wherein the 3-dimensional location or the 6-dimensional pose of the end user camera device is determined in a relative coordinate frame, and wherein the relative coordinate frame is not itself specifically located relative to an absolute coordinate frame.

The method can be performed wherein the absolute coordinate frame includes geolocation.

The method can be performed wherein the plurality of individual surface features comprises at least 10, 100, 1000, 10000, 100000, 1000000, or 10000000 individual surface features.

The method can be performed wherein the scanning camera device comprises one or more individual cameras, and wherein the end user camera device comprises one or more individual cameras.

A system can include one or more computers, wherein the one or more computers perform or are configured to perform the foregoing method.

A system can include one or more computers, wherein the one or more computers perform or are configured to perform a first portion of the foregoing method and cause or are configured to cause one or more other computers to perform a second portion of the method, such that the method is performed jointly by the one or more computers and the one or more other computers.

One or more non-transitory computer readable media can be encoded with computer code that is or can be executed by the one or more computer systems to perform the foregoing method.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

1 OVERVIEW

Figure 1:
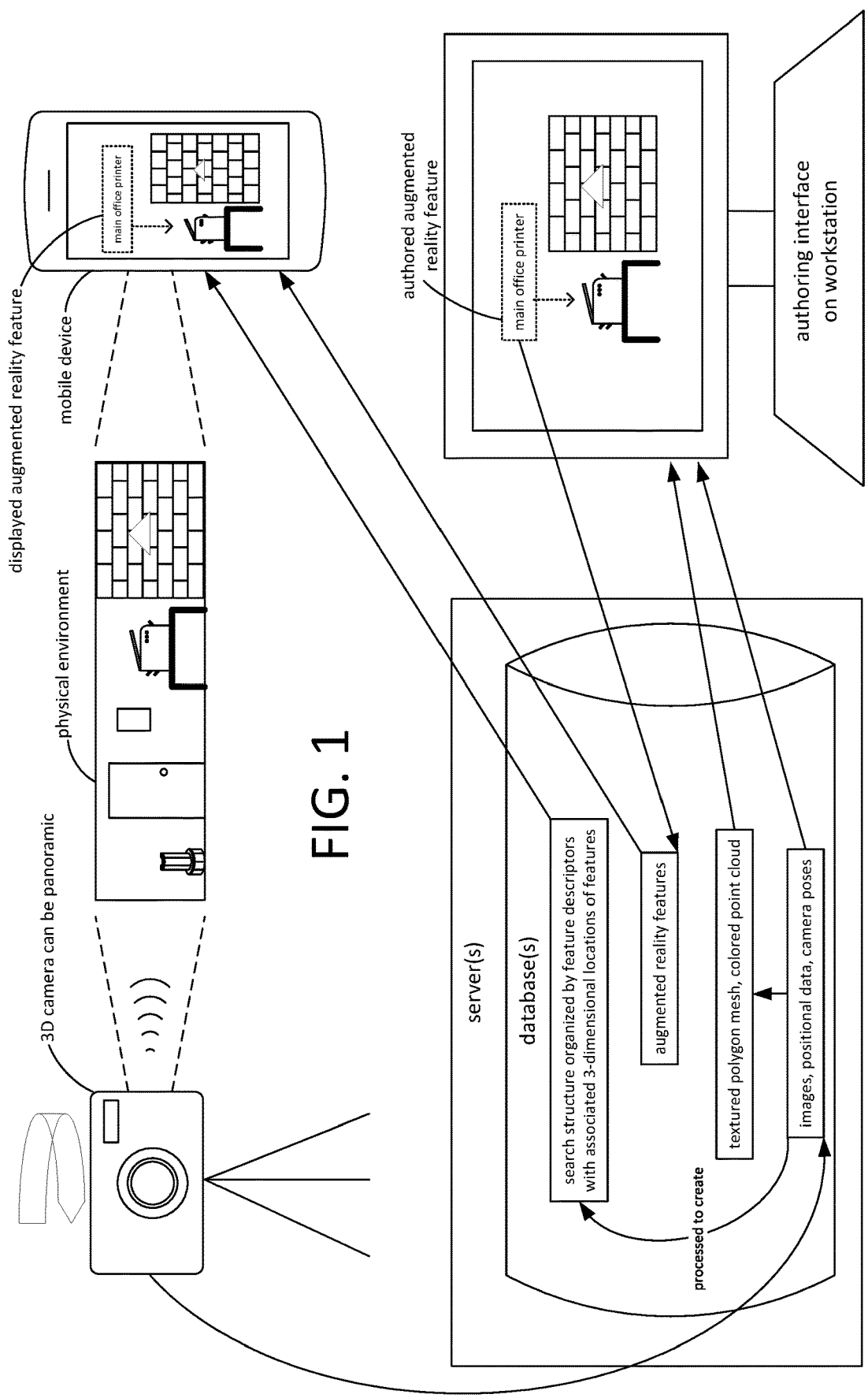
FIG. 1 illustrates an overview of a system and method in accordance with one embodiment.

FIG. 1 illustrates an overview of a system and method in accordance with one embodiment. The system and method can support image based localization (determination of location) of devices through recognition of surface features for a previously scanned physical environment. The system and method can also support authoring and positioning of augmented reality features in an authoring interface using the same images and positions of surface features that are to be used for subsequent mobile device localization. As a result, mobile devices leveraging those same images and positions of surface features for localization will be more likely to obtain a localization that is consistent with the positioning displayed in the authoring interface. Augmented reality features authored using the same scan of the environment can be reliably displayed to an end user of an augmented reality application in a position consistent with their authoring in a common coordinate system, even though the authoring may have been performed remotely, away from the actual situs of the physical environment. Any arbitrary coordinate system for localization in the physical environment can be used, such as one centered on a first of multiple panoramic scans, and an absolute or geographical location is not needed to implement augmented reality.

Referring to FIG. 1, a 3D scanning camera device captures digital images and image positional data, such as pixel depth/location and camera pose, for a physical environment. The images and positional data can be stored in database(s) and processed by server(s) to identify individual surface features within the physical environment captured within the images. The processing characterizes the identified search features using feature descriptors which act as an identifying "fingerprint" of each feature. The server(s) can catalog the feature descriptors and their associated 3D locations in a search structure, which the server(s) can send to an end user's mobile device for use in localization.

During a localization process, the mobile device captures an image of the same physical environment, identifies surface features within the image, and matches feature descriptors for the newly identified features against those in the search structure. When at least four matches are found, the 3D locations of the matching features can be used with known triangulation techniques to determine the 6-dimensional pose or 3-dimensional location of the mobile device's camera. Known triangulation techniques generally require at least four points to determine a camera pose from an image, but in practice many more, such as hundreds or thousands of points, are typically used to improve accuracy. The device's pose can then be used, for example, to position the display of augmented reality features overlaid on the physical environment scene. The device's location can also or alternatively be used for various purposes such as providing directions or showing location on a map.

The images and positional data captured by the scanning camera can also be processed to create a point cloud and/or a textured polygon mesh representation of the physical environment. The point cloud can but need not be a colored point cloud representation. The point cloud and/or the textured polygon mesh representation can also be stored in the database(s). The point cloud and/or textured polygon mesh representation, in addition to the captured digital images, provide a convenient interface through which a user can navigate to create and position augmented reality features, which are then stored in the database(s). When an end user's mobile device is within a scanned physical environment, the augmented reality features for that environment as well as the feature search structure for that environment can be retrieved from the database(s), which together can support the accurate display of augmented reality features overlaid on a physical environment scene. Known techniques, such as last known GPS location and displayed machine readable codes can be used by the mobile device to determine the particular physical environment within which the mobile device is located.

2 METHOD OF OPERATION

A method in accordance with various embodiments will now be described in detail. The method describes the processing of captured image data to support localization of end user camera devices within a captured physical environment. The method also describes the use of the processed data by end an end user camera device to perform the localization. The method also describes the use by an authoring user of an authoring interface to author augmented reality features in a captured physical environment. The method also describes the display of authored augmented reality features to an end user based on the localization of the end user device in the environment.

The method can be performed by one or more computers, each of which have at least one processor and a memory. The computers can include, for example, one or more server computers operating or accessing one or more databases. The computers can include scanning camera devices and computers that operate or operate upon data captured by the scanning camera devices. The computers can include end user camera devices, such as mobile phones, tablets, and mixed reality devices. The computers can include workstations or desktop computers.

2.1 PROCESSING THE PHYSICAL ENVIRONMENT SCAN

The processing of captured image data to support localization of end user camera devices within a captured physical environment begins with a server computer accessing image data including one or more digital images and positional data for the one or more digital images. The physical environment can be, for example, an interior space such as the interior of a home, apartment, building, factory or plant that has an adequate proportion of stationary objects, structure or features based upon which a sparse feature map of the environment can be created. Exterior environments are less preferable due to varying lighting conditions and changes due to weather, but in theory exterior environments can be used with the method.

Typically, multiple digital images are captured from the physical environment in the form of pairs of partially overlapping images so as to be able to create a complete mosaic of the physical environment. The multiple images can be panoramic images, but a mosaic of flat images can be used.

In one embodiment, the digital images are captured with a scanning camera device that also captures, generates or causes to be generated positional data for the images taken. The positional data can include, for each of the digital images, a 6-dimensional pose of the scanning camera device and depths or 3-dimensional locations of surfaces represented by pixels of the images. The relative poses of the camera when taking the digital images can be determined by processing during or after capture using simultaneous localization and mapping or other image analysis techniques based on the pairs of overlapping images.

The positional data can also include, for each of the digital images, depths and/or 3-dimensional locations of pixels of the images, which can be provided by a 3D camera. Various types of 3D cameras can be used, such as a depth camera that takes high resolution photographs and uses an infrared time of flight sensor to determine distances from the camera to the surfaces within its field of view that are being photographed. In one embodiment, the Matterport Pro2 depth camera is used. Laser scanners such as the Leica BLK360, which creates full-color panoramic images overlaid on a high-accuracy point cloud, can be used. Optical cameras can also be used in conjunction with post processing photogrammetry functionality that determines pixel depths and/or locations using various known techniques, though such implementations may not produce accurate results. The more accurate the data from the camera and/or processing, the more accurate the resulting localization will generally be. The scanning camera device can include one or more individual cameras or camera lenses to facilitate the capture of panoramas. Some panoramic camera devices rotate one or more cameras around an axis to capture a 360 degree view, while others, such as panoramic video cameras, can be configured with multiple lenses that simultaneously capture a full 360 degree view.

Returning to the accessed image data, the server computer processes the image data to algorithmically identify a plurality of individual surface features represented in the one or more digital images. Known techniques can be used to identify surface features from digital images and such techniques will not be described in detail here. In general, however, such techniques seek to identify unique areas of images that are distinguishable and well-suited to being subsequently recognized using machine vision techniques. The number of individual surface features identified can vary widely, and might be anywhere, depending on the complexity of the environment, from tens to thousands of features per image, and anywhere from tens to tens of millions of features or more, such as 10, 100, 1000, 10000, 100000, 1000000, or 10000000, for a scanned physical environment. In general, however, the more features that are identified, the more points that will be subsequently available to an end user camera device for localization.

In one embodiment, the plurality of individual surface features are algorithmically identified with a bias in favor of even spacing between nearest individual surface features. In one embodiment, the plurality of individual surface features are algorithmically identified with a bias against uneven gaps between nearest individual surface features. By spacing the identified features evenly, an end user camera device will be more likely to have an adequate number of points within its field of view regardless of its particular pose.

In one embodiment, before processing the image data to identify individual surface features, the server processes the image data to identify areas of the one or more digital images representing moveable objects and excludes the identified areas from consideration when identifying surface features. This avoids the inadvertent inclusion of features of objects in the physical environment that might be moved between the scan of the environment and subsequent localization. A trained machine classifier can be used to perform the identification of areas representing moveable objects in one embodiment.

In one embodiment, the trained machine classifier analyzes the digital images themselves to identify the areas of the one or more digital images representing moveable objects. In one embodiment, the classifier analyzes the images and the positional data to identify the areas. By way of example, if the physical environment includes a white table standing in front of a white wall with little or no contrast between the two, analysis based on the image alone may be unsuccessful in identifying the table. When depth or positional data is taken into account, the table can be easily identified and distinguished from the flat wall in front of which it stands. In one embodiment, the trained machine classifier operates on a point cloud (optionally colored) and/or a polygon mesh (optionally textured) representation of the physical environment. The classifier can identify one or more 3-dimensional volumes within the physical environment that are determined to contain moveable objects. The identified volumes can be mapped to the digital images in order to determine areas of the digital images that are to be excluded from consideration when identifying surface features.

For each of the identified individual surface features, the server creates a feature descriptor based on the surface feature as the feature is represented in one of the one or more digital images. Known techniques can be used to feature descriptors from identified features in digital images and such techniques will not be described in detail here. In general, however, such techniques seek to create a recognizable "fingerprint" for each feature that can be matched against the same feature as captured in different digital images. In certain implementations, the feature descriptor is or characterizes a small window or area of pixels that make up the identified surface feature in a processed image.

For each of the identified individual surface features, the server also determines a 3-dimensional location of the surface feature in the physical environment based on the positional data. The server associates the determined 3-dimensional location with the surface feature or equivalently with its feature descriptor. In one embodiment, depth data for pixels representing the surface feature in an image is processed along with the pose of the camera to determine the 3-dimensional location. In one embodiment, 3-dimensional locations of individual pixels in an established coordinate frame can be supplied by the scanning camera device and/or through post processing of its data, which in turn can be used to determine a 3-dimensional location of the surface feature in the physical environment. Some scanning camera devices produce point cloud data, which can be used as a basis for determining 3-dimensional locations of the individual surface features.

For the identified surface features, the server or the end user camera device organizes the features or equivalently the feature descriptors, based on the feature descriptors, in a feature search structure, which can be referred to as a sparse feature map. In one embodiment, the feature descriptors are configured in such a way that they can be catalogued in a searchable database or search structure, quickly searched for and matched against newly supplied feature descriptors. In one embodiment, the sparse feature map is embodied as a tree-based search structure indexed based on the feature descriptors, but other search structures or databases could be used. The search structure can also be configured to store, along with each searchable feature descriptor, the 3-dimensional location associated with the corresponding identified individual surface feature, or equivalently the feature descriptor.

The search structure, once populated with the feature descriptors and the associated 3-dimensional locations, can then be made available by the server and/or database(s) for download to or access by end user camera devices for localization within the physical environment. In one embodiment, the server serializes or assembles the data contained within or to be contained within the search structure in compact form separate from the search structure itself, and makes the data available for download or access. The end user camera device then creates the search structure independently and populates the search structure with the downloaded data. If the end user camera device is moved to another physical environment, a new dataset can be downloaded and populated into the search structure. In one embodiment, the whole search structure can be made available for access and download to the end user camera device by the server.

2.2 LOCALIZATION BY THE END USER CAMERA DEVICE

The use of the processed data by end an end user camera device to perform localization begins with the creation of or retrieving of the populated feature search structure or sparse feature map as described above. By way of example, an end user could enter a building from outdoors where their mobile phone, the end user camera device in this case, last had GPS signal. An application on the phone automatically determines that the building, based on its GPS location, has been scanned as a physical environment and that a sparse feature map with position data is available. The phone then retrieves the sparse feature map and with the search structure instantiated in the end user camera device's memory, the device can then capture an image of a portion of the physical environment to start the localization process using the interior physical environment of the building.

The end user camera device then processes the captured image to algorithmically identify at least four image features represented in the captured image. The image features can be identified using similar techniques to those referenced above with respect to identifying surface features. While at least four features are needed to unambiguously determine a 6-dimensional pose of the camera, hundreds of surfaces features are typically identified in an image and used in order to improve accuracy.

For each of the identified image features, the end user camera device: identifies a 2-dimensional location of the image feature within the captured image and creates a feature descriptor based on the image feature as represented in the captured image. The device searches within the feature search structure to identify a corresponding surface feature matching the feature descriptor of the image feature and accesses the 3-dimensional location of the corresponding surface feature. The feature descriptor can be created using similar techniques to those referenced above. With the 3-dimensional locations of the corresponding surface features that match the at least four image features, along with the 2-dimensional locations of the image features within the captured image, the end user camera device can determine a 3-dimensional location or a 6-dimensional pose of its camera, and therefore the end user camera device, using known triangulation techniques.

The 3-dimensional location or the 6-dimensional pose of the end user camera device can be determined in a relative coordinate frame or an absolute coordinate frame. The relative coordinate frame can be, for example, established with an origin aligned with the initial pose of a first image captured during a scanning session. The relative coordinate frame can, but need not be specifically defined relative to an absolute coordinate frame, such as a geopositioning and/or geo-orientation.

While the above embodiment describes localization being performed on the end user camera device, the above localization steps can be performed jointly between the server(s) and the end user camera device by passing data between the devices. By way of example, the end user device could pass image images or feature descriptors to the server to be processed, and the server can return a 6-dimensional pose. Various combinations of the server and the end user camera device performing the various steps are contemplated by this disclosure.

2.3 AUTHORING AUGMENTED REALITY FEATURES IN A VIRTUAL ENVIRONMENT

The use by an authoring user of an authoring interface to author augmented reality features in a captured physical environment begins with the authoring user loading a visual rendering of the physical environment into the authoring interface. The visual rendering can be based on the image data from the scanning camera device. The authoring interface can be, for example, an application running on a desktop computer or workstation that can display a 2-dimensional view of the physical environment through which the authoring user can navigate, such as with mouse and or cursor controls. The authoring interface can alternatively be, for example, a virtual reality authoring environment where the author is visually immersed within a virtual version of the physical environment. The authoring interface can be, for example, an application executing on a mixed reality device where the author authors mixed reality content in situ at the location of the physical environment.

In one embodiment, the authoring interface can display a colorized point cloud and/or a textured polygon mesh created based on the image data, which presents to the authoring user a colorized and/or texturized but coarsely rendered dollhouse view of the physical environment that can be manipulated, such as by rotation and zooming. As zoom is increased in the dollhouse view, at some point, the dollhouse view can be replaced by actual digital imagery captured by the scanning camera device.

The authoring user at some point can decide to select a 3-dimensional location or 6-dimensional pose within the virtual version of the physical environment at which to create an augmented reality feature. The location can be, for example, on one of the surfaces of the physical environment or anywhere in open space. The authoring interface or application can determine the selected 3-dimensional location or 6-dimensional pose within the physical environment based on the positional data (included in the image data for the captured physical environment, referenced above) and the 6-dimensional pose of the authoring user's view within the virtual version of the physical environment. The 3-dimensional location or 6-dimensional pose selected by the authoring user within the physical environment can be specified in the same coordinate frame used for determining location of the end user camera device.

In addition to specifying the relative or absolute location or pose within the physical environment, the author can also define or select the augmented reality feature to be displayed to the end user, which the authoring interface or application can then associate with the 3-dimensional location or 6-dimensional pose selected by the authoring user. In order to provide feedback to the authoring user, the interface can then display the augmented reality feature to the authoring user in the authoring interface in accordance with the selected 3-dimensional location or 6-dimensional pose.

By way of example, the augmented reality feature can be a static icon, sign, interactive display, or a dynamic display that shows changing information. The augmented reality feature can be a moving or animated feature, character, icon or other graphic. In the case of moving augmented reality features, the authoring user can define a path over which the feature moves over time, and one or more triggers that start, stop, or regulate the speed at which the feature traverses the path. The triggers can be initiated, for example, by an end user action, such as a request for walking directions within a building.

2.4 DISPLAY OF AUGMENTED REALITY FEATURES IN A COMMON COORDINATE FRAME

The display of authored augmented reality features to an end user based on the localization of the end user camera device, such as a mobile phone, in the environment can be performed in real-time based on 6-dimensional pose information determined as explained above. The display of a feature continues from the above description of localization of an end user camera device, in response to an end user capturing an image from the physical environment using the end user camera device. The end user camera device determines, based on the 6-dimensional pose of the end user camera device, that the captured image contains the 3-dimensional location or 6-dimensional pose selected by the authoring user, as described above. The end user camera device then displays the augmented reality feature to the end user in a location corresponding to the 3-dimensional location or 6-dimensional pose selected by the authoring user based on the 6-dimensional pose of the end user camera device.

In one embodiment, the augmented reality feature is displayed to the end user superimposed over a display of the captured image on a display screen of the end user camera device in an augmented reality application. In one embodiment, the end user camera device is a mixed reality device, and the augmented reality feature is displayed to the end user superimposed over and in alignment with the end user's direct sight view of the physical environment by the end user camera device.

3 COMPUTER IMPLEMENTATION

Components of the embodiments disclosed herein, which may be referred to as methods, processes, applications, programs, modules, engines, functions or the like, can be implemented by configuring one or more computers or computer systems using special purpose software embodied as instructions on one or more non-transitory computer readable media. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 2:
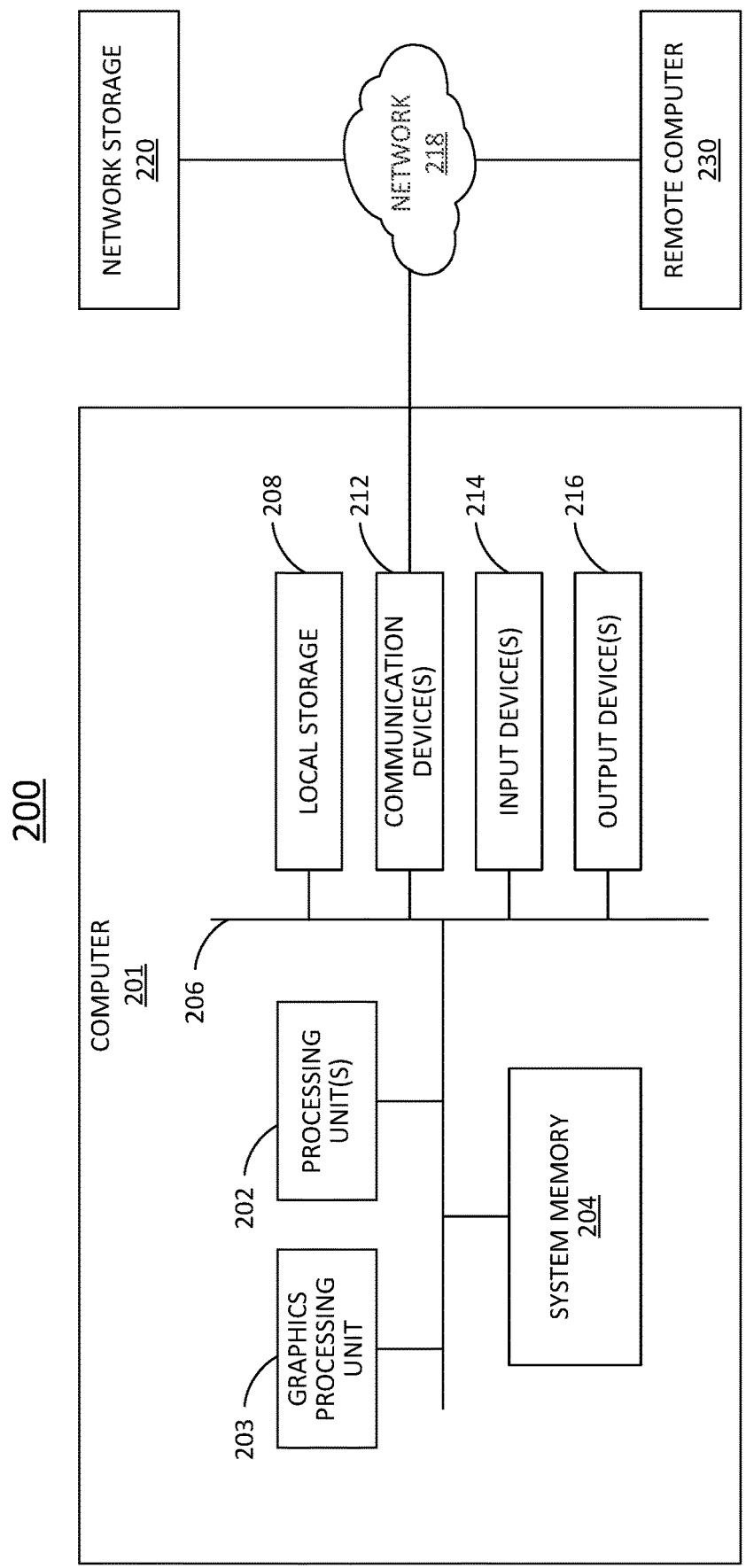
FIG. 2 illustrates a general computer architecture that can be appropriately configured to implement components disclosed in accordance with various embodiments.

FIG. 2 illustrates a general computer architecture 200 that can be appropriately configured to implement components disclosed in accordance with various embodiments. The computing architecture 200 can include various common computing elements, such as a computer 201, a network 218, and one or more remote computers 230. The embodiments disclosed herein, however, are not limited to implementation by the general computing architecture 200.

Referring to FIG. 2, the computer 201 can be any of a variety of general purpose computers such as, for example, a server, a desktop computer, a laptop computer, a tablet computer or a mobile computing device. The computer 201 can include a processing unit 202, a system memory 204 and a system bus 206.

The processing unit 202 can be or include one or more of any of various commercially available computer processors, which can each include one or more processing cores that can operate independently of each other. Additional co-processing units, such as a graphics processing unit 203, also can be present in the computer.

The system memory 204 can include volatile devices, such as dynamic random access memory (DRAM) or other random access memory devices. The system memory 204 can also or alternatively include non-volatile devices, such as a read-only memory or flash memory.

The computer 201 can include local non-volatile secondary storage 208 such as a disk drive, solid state disk, or removable memory card. The local storage 208 can include one or more removable and/or non-removable storage units. The local storage 208 can be used to store an operating system that initiates and manages various applications that execute on the computer. The local storage 208 can also be used to store special purpose software configured to implement the components of the embodiments disclosed herein and that can be executed as one or more applications under the operating system.

The computer 201 can also include communication device(s) 212 through which the computer communicates with other devices, such as one or more remote computers 230, over wired and/or wireless computer networks 218. Communications device(s) 212 can include, for example, a network interface for communicating data over a wired computer network. The communication device(s) 212 can include, for example, one or more radio transmitters for communications over Wi-Fi, Bluetooth, and/or mobile telephone networks.

The computer 201 can also access network storage 220 through the computer network 218. The network storage can include, for example, a network attached storage device located on a local network, or cloud-based storage hosted at one or more remote data centers. The operating system and/or special purpose software can alternatively be stored in the network storage 220.

The computer 201 can have various input device(s) 214 such as a keyboard, mouse, touchscreen, camera(s), microphone, accelerometer, thermometer, magnetometer, or any other sensor. Output device(s) 216 such as a display, speakers, printer, or eccentric rotating mass vibration motor can also be included.

The various storage 208, communication device(s) 212, output devices 216 and input devices 214 can be integrated within a housing of the computer, or can be connected through various input/output interface devices on the computer, in which case the reference numbers 208, 212, 214 and 216 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

4 CONCLUSION

Although the subject matter has been described in terms of certain embodiments, other embodiments that may or may not provide various features and aspects set forth herein shall be understood to be contemplated by this disclosure. The specific embodiments described above are disclosed as examples only, and the scope of the patented subject matter is defined by the claims that follow. In the claims, the term "based upon" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by one or more computer systems, each computer system having at least one processor and a memory, the method comprising:
accessing image data comprising a plurality of digital images that have been captured of a physical environment by a scanning camera device, the plurality of images forming a continuous mosaic of overlapping images representing the physical environment, and the image data further comprising positional data for the plurality of digital images;
processing the image data to algorithmically identify a plurality of individual surface features represented in the plurality of digital images;
for each of the plurality of individual surface features:
    creating a feature descriptor based on the surface feature as represented in one of the plurality of digital images, and
    determining, based on the positional data, and associating with the surface feature, a 3-dimensional location of the surface feature in the physical environment;
organizing the features identified in the plurality of digital images, based on the feature descriptors, in a common feature search structure;
subsequent to the organizing, accessing an image of a portion of the physical environment captured by an end user camera device that is not the scanning camera device;
processing the image to algorithmically identify at least four image features represented in the captured image, and for each feature of the at least four image features:
    identifying a 2-dimensional location of the image feature within the captured image,
    creating a feature descriptor based on the image feature as represented in the captured image,
    searching within the common feature search structure to identify a corresponding surface feature matching the feature descriptor of the image feature, and
    accessing the 3-dimensional location of the corresponding surface feature; and
determining a 3-dimensional location or a 6-dimensional pose of the end user camera device based on:
    the 3-dimensional locations of the corresponding surface features matching the at least four image features, and
    the 2-dimensional locations of the image features within the captured image.

2. The method of claim 1, further comprising:
displaying, to an authoring user, an authoring interface through which the authoring user can navigate within a visual rendering, based on the image data, of the physical environment;
in response to input from the authoring user with respect to the visual rendering of the physical environment, determining based on the positional data, a 3-dimensional location or a 6-dimensional pose within the physical environment selected by the authoring user;
in response to input from the authoring user, associating an augmented reality feature with the 3-dimensional location or the 6-dimensional pose selected by the authoring user;
displaying the augmented reality feature to the authoring user in the authoring interface in accordance with the 3-dimensional location or the 6-dimensional pose selected by the authoring user;
in real-time and in response to an end user capturing the image from the physical environment using the end user camera device:
    determining, based on the 6-dimensional pose of the end user camera device, that the captured image contains the 3-dimensional location or the 6-dimensional pose selected by the authoring user, and displaying the augmented reality feature to the end user in a location or pose corresponding to the 3-dimensional location or the 6-dimensional pose selected by the authoring user based on the 6-dimensional pose of the end user camera device.

3. The method of claim 2, wherein the augmented reality feature is displayed to the end user superimposed over a display of the captured image on a display screen of the end user camera device in an augmented reality application.

4. The method of claim 2, wherein the end user camera device is a mixed reality device, and wherein the augmented reality feature is displayed to the end user superimposed over and in alignment with the end user's direct sight view of the physical environment by the end user camera device.

5. The method of claim 2, wherein the image data further comprises a colorized point cloud or a textured polygon mesh created based on the plurality of digital images and the positional data, and wherein the visual rendering is further based on the colorized point cloud or the textured polygon mesh.

6. The method of claim 1, wherein the positional data comprises, for each of the plurality of digital images:
 a 6-dimensional pose of the scanning camera device, and
 depths or 3-dimensional locations of pixels.

7. The method of claim 6, wherein the scanning camera device comprises a depth camera configured to measure and record distances of physical surfaces from the depth camera for pixels representing the physical surfaces in the plurality of digital images.

8. The method of claim 1, wherein the image data comprises one or more point clouds defining 3-dimensional locations of physical surfaces represented by pixels of the plurality of digital images.

9. The method of claim 8, wherein the scanning camera device is a 3D scanner configured to generate and register one or more point clouds in alignment with the plurality of digital images.

10. The method of claim 1, wherein the plurality of individual surface features are algorithmically identified with a bias in favor of even spacing between nearest individual surface features.

11. The method of claim 1, wherein the plurality of individual surface features are algorithmically identified with a bias against uneven gaps between nearest individual surface features.

12. The method of claim 1, wherein the common feature search structure is a tree-based search structure indexed based on the feature descriptors.

13. The method of claim 2, wherein the 3-dimensional location or the 6-dimensional pose of the end user camera device is determined in a relative coordinate frame, wherein the 3-dimensional location or the 6-dimensional pose selected by the authoring user is specified in the relative coordinate frame, and wherein the relative coordinate frame is not itself specifically located relative to an absolute coordinate frame.

14. The method of claim 13, wherein the absolute coordinate frame comprises geolocation.

15. A system comprising one or more computers, wherein the one or more computers perform the method of claim 1.

16. One or more non-transitory computer readable media having instructions stored thereon, wherein the instructions are executed by one or more computers to cause the one or more computers to perform the method of claim 1.

17. The method of claim 1, wherein the "determining a 3-dimensional location or a 6-dimensional pose of the end user camera device" is performed without referencing a geographic location of the capture of the image of the portion of the physical environment.

* * * * *